A. HERNANDEZ-MEJIA.
PROCESS OF MAKING PHOTOGRAPHIC STEREOSCOPIC TRANSPARENCIES.
APPLICATION FILED OCT. 11, 1917.
1,282,829. Patented Oct. 29, 1918.
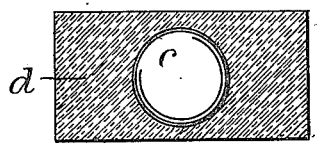
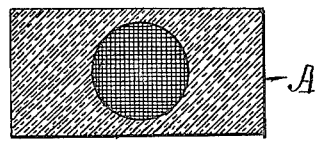
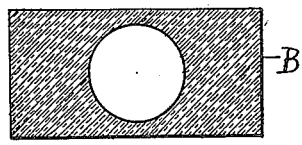
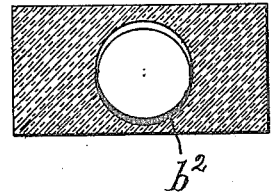
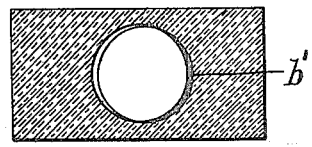
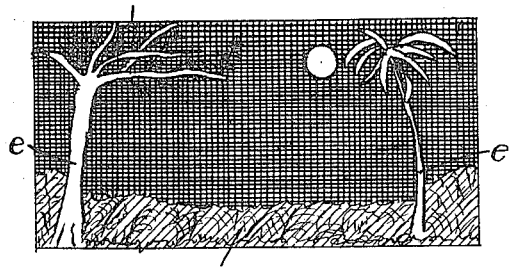
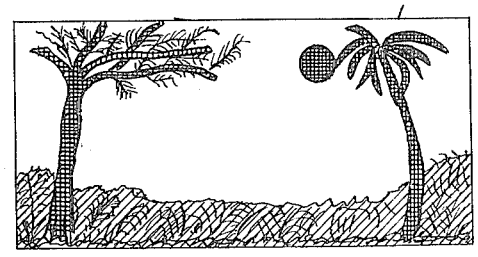
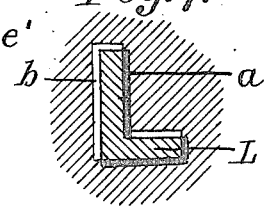
Inventor. Arturo Hernandez Mejia.

UNITED STATES PATENT OFFICE.

ARTURO HERNANDEZ-MEJIA, OF NEW ROCHELLE, NEW YORK.

PROCESS OF MAKING PHOTOGRAPHIC STEREOSCOPIC TRANSPARENCIES.

1,282,829.  Specification of Letters Patent.  Patented Oct. 29, 1918.

Application filed October 11, 1917. Serial No. 195,894.

*To all whom it may concern:*

Be it known that I, ARTURO HERNANDEZ-MEJIA, a citizen of the Republic of Venezuela, residing at 6 Alpha Place, New Rochelle, county of Westchester, and State of New York, have invented certain new and useful Improvements in Processes of Making Photographic Stereoscopic Transparencies, fully described and represented in the following specification and the accompanying drawings, forming a part of the same.

This invention relates to the art of making photographic pictures of motion or still life, in single prints or in ribbons or films, for viewing by direct or reflected light, or by projecting on suitable screens; the invention operating in some cases to produce an appearance, in the images, of stereoscopic relief; and also affording the means of presenting the images in various single colors, or combinations of hues and shades, including white figures and lettering for titles, and silhouettes.

The invention has for its object the producing of transparencies either singly or in films or ribbons, which can be used for projection by any ordinary lantern or motion picture machine without alteration of such machine, and the production of such transparencies to produce stereoscopic relief and color effects, suitable for titles, cartoons, and silhouette reproduction.

This invention may be employed, in conjunction with the process described in my Patent No. 1,174,144 dated March 7, 1916, in which process two negatives of the same subject, reversed in relation to one another, and taken through complementally colored screens, are employed to print upon opposite sides of a two-sided sensitized film; the images on such film being complementally colored by suitable means as described in the said patent; and reference is made to the said patent in connection with any description herein of a two-sided sensitized film.

This invention may also be employed to produce stereoscopic relief, irrespective of any color effects, by taking a negative of selected subjects, lettering or action, then making a positive from the said negative, and printing upon opposite sides of a two-sided sensitized film through the said positive and negative, both operating as negatives; and arranged somewhat out of register so as to produce light and dark outlines upon the edges of the images projected from such film. Such outlines produce the desired stereoscopic or bas-relief effect.

If no dual or multiple color effects are desired, ordinary films sensitized on one side only can be used, but printed from both sides through the two negatives and developed with or without coloring, dried, and projected in the usual manner. Other modifications of the invention may be employed, as hereinafter set forth and claimed.

In the following description I have, for illustration, suggested the employment of certain colors, but it is obvious that in practice any suitable colors may be used.

The invention will be understood by reference to the annexed drawing, in which Figure 1 is a diagram of a white ball upon a gray background; Fig. 2 represents a photographic negative of the subject in Fig. 1; Fig. 3 represents a print from the negative shown in Fig. 2; Fig. 4 shows a print from the negative shown in Fig. 2 and from positive shown in Fig. 3, with shading at the right side of the ball; and Fig. 5 is a print of the same subject with shading at the top of the ball. Fig. 6 is a negative of a background showing grass and trees; and Fig. 7 is a positive printed from such negative. Fig. 8 shows a print from the positive Fig. 7 and the negative Fig. 6, with lettering super-added. Fig. 9 shows a shaded letter.

The means for producing stereoscopic relief will be understood by the following description.

While printing a film coated on both sides, in practising my patented process (Patent No. 1,174,144) I have found whenever the two negatives did not register accurately, that an unusual amount of relief was apparent in the images projected from the double-coated film, and in seeking the explanation found that it was due to the bas-relief effect produced by a black line *a* on one side of the subject or figures or letters used, with a white line *b* on the opposite side.

This line (white and black) is caused as follows:

Take the photograph of a white ball or disk *c*, Fig. 1, on a field *d* of gray. As a white ball would not show its sphericity, a photographic negative A taken of this ball will look like Fig. 2, with the ball black on a gray ground; while a positive print B of this negative will look like Fig. 3, which partly resembles Fig. 1. The gray $d$ expressed by the diagonal shading we will assume is of such a shade as to be half-tint, which will be about alike in the negative and the positive.

We now print from these two, the negative A and the positive B, as though they were two negatives, using them to print on opposite sides of a two-side coated film, for coloring on each side separately.

If our negatives register with one another, and the print is colored on opposite sides with complementary colors (for instance red and green) we will have on projection a green ball or a red ball according to which side the color is applied by toning or dye-changing the silver image. But should our printer accidentally or purposely produce a print out of register, the result will be a print like Fig. 4, with shade-line $b'$ at the side if the registration fails sidewise, or like Fig. 5 with shade-line $b^2$ at the bottom if the registration fails up and down. These transparencies projected or viewed directly, will give an aspect of relief.

If we apply this simple process to practical use, such as in motion picture films, or lantern slides, and we prepare the stage or setting properly, we are enabled to make semi-silhouettes, "still" or in motion, with or without half-tones, and upon purposely printing out of register on both sides of a film photographically sensitized, (such a film as is used for the working of my Patent No. 1,174,144) from the negative and the positive of properly prepared subjects, and coloring each side separately, we will obtain a film showing still or moving figures, which are of a solid color, say red, and scenery surrounding these figures in another color, say green, with middle shades between the extreme densities. The figures or objects will have an outline of a dark color on one edge, and a white line on the other edge, giving, in the case of silhouettes, an appearance of figures cut out of thin wood or cardboard, like jig-saw work, colored, and moving in a field of other objects colored differently. Such shading is illustrated upon the letter L in Fig. 9.

In another use of this invention, we may make a negative $A'$ with any ordinary camera, still or moving, on any suitable background, say, for instance, grass with tall trees $e$ and shrubs $f$, as in Fig. 6, in which it can be seen that the center is quite dense without any figures or designs. If we make a positive exposure $B'$ from this negative, as in Fig. 7, the center will be quite clear, that is to say, there will be no exposure, because the negative is very dense in this region and will not allow the light to act on the sensitized film. Let us now put the positive of Fig. 7, (undeveloped) in the plate-holder in the case of still photographs, or in the aperture plate of a motion picture camera, and expose it to a subject which is focused to occupy only the center portion of the picture. This subject, for instance, lettering or other special titles C, should be white, on a black background.

After exposure of this lettering C, on the already exposed plate or film $B'$, (which constitutes a double exposure), and developing in the usual way by a "contrasty" developer, and drying, we will use it as a negative, reversed from right to left, to pair with the original negative, and then print from both these negatives on opposite sides of a photographically sensitized film, preferably on a two-side coated film. In the case of a two-side coated film $B^2$, upon coloring each side separately, and projecting, it will be found as in Fig. 8, that the trees $e'$ will be of one color, say red, the sky $g$ will be of another, say blue, the moon $h$ of a yellowish color, because being originally drawn in a gray or half-tone, will have half-red on one side of the film and half-blue-green on the other, a condition which gives yellow-gray on projection. All other things drawn $\frac{3}{4}$ gray or $\frac{3}{4}$ tone will be blue-gray. In the center of the blue sky or field $g$, there will appear the letters C undiluted by any color, and if the negatives $A'$ and $B'$ are not in register, the trees and other objects will have a dark border $a$ on one edge and a white border $b$ on the opposite edge, as shown in Fig. 9, which gives the effect of relief.

Further carrying out this invention, it is possible to substitute for the letters or the titles C shown in Fig. 8, human figures, animals, &c., still or in motion, in silhouette or otherwise, plastic figures, comedy actors, cartoons, or any other subjects in which it would be desirable to bring out the figures in striking white relief against background of one or more colors on the same film. It is not absolutely necessary to use film coated on both sides to produce this stereoscopic effect. The same result can be obtained, although with more limitation as to the range of color-possibilities, by using ordinary single coated film, and printing from the negative first, developing, toning, (for instance with ferricyanid and ferric chlorid), and drying in the dark before exposing again to the other negative, (the "positive negative") which would be applied without exact register, and ofter developing using the hypo or similar cleaning bath.

The resultant print, which now consists of a blue image and a black counter image, can be used at this stage, or can be colored say in an iodid-dye bath, which will affect the black silver image but not materially change the blue image.

Other toning colors can be combined with equal success, the white and black lines, produced by the lack of registration, being the feature of the operation. No specific description of the toning baths or iodid-dye baths is given, as these practices are to be found in most any text-books on photography.

Where the backgrounds are drawn in black and white and gray, it is possible to produce additional color combinations by using a gray scale, which consists of 0-white, one-quarter light-gray, one-half gray, three-quarters dark-gray, and 0-black.

The negative-positive will reverse these gray tones, and as it is well known that the image can be colored in proportion to its silver deposit, I have found that a print made under these conditions, on a two-side coated film, will give colors on projection or viewing, according to the following table:

0-Green×1 red=red.
¼-Green×¾ red=blue-violet gray.
½-Green×½ red=blue-gray.
¾-Green×¼ red=yellowish-gray.
1-Green×0-red=green.

It is apparent that by changing the gray scale of the design when the negative has been made, the positive counter-print taken, both used as negatives, and the two-side coated film print made and developed, and colored in complementary colors, that upon projection, a number of colors, hues and shades are obtained.

A further development of my invention includes a method of coloring the two-side sensitized print. Of course, any known method of coloring both sides of the film, for instance, projecting one side, and then coloring the other side, can be used; but I have found a novel and better method.

Whether a chemical tone (ferricyanid plus cupric sulfate for red, or ferricyanid and ferric chlorid for blue, for instance), or a dye image (iodid for a bleach and basic dyes applied to the mordant formed by the silver-iodid, for instance) be used to color the film, I immerse the entire unprotected film in the liquid bleach or color former, to obtain one color on both sides first, and when the images on both sides are colored sufficiently, I either protect one side and wholly immerse in the solution which will form the other color on the color already there, or apply the color former or changer to only one side by spray or saturated pads.

The novelty of my invention consists in treating both sides first, and then changing or altering the color of one side only.

As an example which will enable anyone versed in the art of photography to practise this invention, I will describe two of my favorite methods.

By one method, I immerse the two-side coated film after exposure and development in a bath of alkali ferricyanid and a salt of a metal, for instance, uranium or copper or both, which tones the silver image on both sides to a reddish color; after washing and drying I then subject one of the two sides to a bath of, for instance, ferric chlorid, acidified, which turns the reddish image to a blue-green color, leaving the other side as it was, either because I have previously protected it by a waterproof coating, or because I have used a mechanical device to keep one side away from the liquid which is to change the color on the other side. Or, I bleach the two-side coated film, after exposing and developing it, in an iodid bath, and then immerse it in a basic dye, which, as is well known, will cause the image to reappear in a monochrome color corresponding to the dye used; I then wash and dry the film and subject one side of the film only to a strong bath of another basic dye, by which method I find that the iodid of silver, or the hydrosol of the silver salt, combined with a basic dye, for instance, auramin and rhodamin, for orange tones, will form an excellent mordant for another basic dye, for instance, malachite green, for green tones, or methylene blue for blue tones, thus turning the orange or another color tone of one side of the film to another desired color, leaving the other side as was originally dyed or colored.

These methods simplify very materially the long operations which are usually practised in attempting to color, first one side of a film and then separately coloring the other side, because such separate colorings are usually of long duration, sometimes hours, while treating both sides at once can be easily accomplished in ordinary appliances in use in any photographic establishment.

The act of turning a dye image into another shade, hue or color, is very rapid, in some cases requiring only seconds, a very desirable condition in the making of motion picture films; while the action of the original dye on the bleached film in prior methods is a matter of many minutes and sometimes hours, too long a period to successfully keep the bleach on one side guarded.

In preparing the subjects for this work, I find it desirable to use a gray scale of coloring ranging as follows, using:

White for green,
Light gray for bluish.
Gray for gray,
Dark gray for yellowish,
Black for red.

Thus, all parts of the subject on backgrounds that are pure white will have a dense silver deposit on one side of the resultant two-side coated film, and as that deposit will be changed to orange, for instance, and there will be no deposit on the opposite side, the projection of that area will be orange. In the case of black in the subject the opposite will result and green will be the projection.

Middle tones will partake of some orange and some green in varying degrees, producing areas of yellowish or bluish hues. Other colors than green and orange used on the opposite sides of the film, will produce a multiplicity of hues and colors, according to the color or shade of the subject.

In photographing cartoons singly to produce motion on projection, the gray scale would be used, but the results are colors on the final film, (if dyed or toned) in proportion to the gray scale. If black outlines, such as would be desirable on cartoons and similar work, are necessary, these can be obtained by printing on either side, from a combination of the negatives in addition to former steps. The original negative and the positive made from it, when placed together, can be used as a single negative to make this additional printing, as the slight outline, visible or exposed to the light, surrounding such object, will increase the exposure on both sides, and if complementary colors are used in producing the two-side print, black or total density of the outline will be the result.

It will be understood that the black and white outline with its associated stereoscopic effect can be produced upon a single-coated film or plate by printing upon such film or plate with the negative and the positive simultaneously disposed a little out of register as described above. Such effect is shown in Fig. 9.

The application of this feature is not therefore limited to two-side coated films.

From the above description it will be seen that the essential feature of the process consists in making the photographic negative and positive from the same subject and using both to produce a print; whether applying them both to the same side, or one to each side of a suitably prepared film.

When the opposite sides of a two-side sensitized film are exposed to a negative and its positive, oppositely toned images are, when the film is developed, produced upon opposite sides of the film, which images are adapted to receive color in a different manner, and thus produce, when projected, images variously colored according to the means employed.

Various modifications may be employed in connection with this essential feature, as described and claimed herein.

For instance, where a white sky or field with black figures is desired, in addition to bas-relief and color effects, this can be obtained by making two negatives, one as usual on the sensitized side of the film and the other through the film or glass, (so as to reverse the negative from right to left) and then making a double exposure upon the areas that the light has not originally acted upon; that is to say, where the original drawing or subject was black or its equivalent.

By altering the drawing or subject between the taking of the first and second negatives, the final print would vary in the color of certain areas.

In printing on a two-side coated film, provision is made to prevent the light from affecting the other side of the film, and this is done by making the film-support of a non light-actinic color, as described in my said Patent No. 1,174,144.

Having thus set forth the nature of the invention what is claimed herein is:

1. A process of making photographic transparencies for the purpose of producing the optical effect of stereoscopic images upon projection, which consists in making a transparent negative of an object, then making a transparent positive from said negative, and then placing a sensitized transparent sheet between said negative and said positive, adjusting said negative and said positive so as to be out of register with relation to each other, and printing with said negative and said positive in their said positions upon said sensitized sheet.

2. A process of making photographic transparencies, which consists in making a transparent negative of an object, then making a transparent positive from said negative, and then printing with said negative and said positive upon a sensitized transparent sheet in such manner that the two images formed on said sheet by the two printings will be out of register with relation to each other.

3. A process of making photographic transparencies, which consists in making a transparent negative of an object, then making a transparent positive from said negative, then printing with said negative and said positive upon a sensitized transparent sheet in such manner that the two images formed on said sheet by the two printings will be out of register with relation to each other, and then developing and coloring said sheet.

4. A process of making photographic transparencies for the purpose of producing the optical effect of stereoscopic images upon projection, which consists in making a transparent negative of an object, then making a transparent positive from said negative, and then printing with said negative and said positive upon a transparent sheet which is sensitized on both sides in such manner that the two images formed on said sheet by the two printings will be out of register with relation to each other.

5. A process of making photographic transparencies for the purpose of producing the optical effect of stereoscopic images upon projection, which consists in making a transparent negative of an object, then making a transparent positive from said negative, then printing with said negative and said positive upon a transparent sheet which is sensitized on both sides in such manner that the two images formed on said sheet by the two printings will be out of register with relation to each other, and then developing and coloring both sides of said sheet.

6. A process of making photographic transparencies, which consists in making a transparent negative of an object, then making a transparent positive from said negative, then placing a transparent sheet which is sensitized on both sides between said negative and said positive, adjusting said negative and said positive so as to be out of register with relation to each other, and printing with said negative and said positive in their said positions upon said sensitized sheet, and then developing both sides of said sheet.

7. A process of making photographic transparencies, which consists in making a transparent negative of an object, then making a transparent positive from said negative, then placing a transparent sheet which is sensitized on both sides between said negative and said positive, adjusting said negative and said positive so as to be out of register with relation to each other, and printing with said negative and said positive in their said positions upon said sensitized sheet, and then developing and coloring both sides of said sheet.

8. A process of making photographic transparencies, which consists in making a transparent negative of an object, then making a transparent positive from said negative, then placing a transparent sheet which is sensitized on both sides between said negative and said positive, adjusting said negative and said positive so as to be out of register with relation to each other, and printing with said negative and said positive in their said positions upon said sensitized sheet, and then developing both sides of said sheet, coloring both sides of said sheet similarly, and changing the color upon one side of said sheet.

9. A process of making photographic transparencies which consists in making a transparent negative of an object, then making a transparent positive from said negative, then photographing another object upon said positive before development thereof, then developing said positive, and then printing with said negative and said positive upon a transparent sheet which is sensitized on both sides in such manner that the two images formed on said sheet by the two printings will be out of register with relation to each other.

10. A process of making photographic transparencies, which consists in making a transparent negative of an object, then making a transparent positive from said negative, then photographing another object upon said positive before development thereof, said latter object being prepared on a graduated gray scale, then developing said positive, then printing with said negative and said positive upon a transparent sheet which is sensitized on both sides in such manner that the two images formed on said sheet by the two printings will be out of register with relation to each other, and then developing and coloring both sides of said sheet.

11. A process of making photographic transparencies, which consists in making a transparent negative of an object, then making a transparent positive from said negative, then photographing another object upon said positive before development thereof, said latter object being prepared on a graduated gray scale, then developing said positive, and then placing a senitized transparent sheet between said negative and said positive, adjusting said negative and said positive so as to be out of register with relation to each other, and printing with said negative and said positive in their said positions upon said sensitized sheet.

12. A process of making photographic transparencies for the purpose of producing the optical effect of stereoscopic images upon projection, which consists of making a negative of an object, then altering the gray scale of the same object, then again making another negative of the same object, then placing a transparent sheet sensitized on both sides between said two negatives, adjusting said negatives so as to be out of register with relation to each other, and printing simultaneously with both of said negatives in their said positions upon said sheet.

13. A process of making photographic transparencies, which consists of making a negative of an object, then altering the gray scale of the same object, then again making another negative of the same object, then placing a transparent sheet which is sensitized on both sides between said two negatives, adjusting said negatives so as to be out of register with relation to each other, and printing simultaneously with both of said negatives in their said positions upon said sheet, and then coloring each side of said sheet separately.

14. A process of making photographic transparencies, which consists of exposing a negative of an object, then altering the gray scale of the same object, then again exposing another negative of the same object, then making a negative of another object upon one of said negatives, then developing said negatives, then making a positive from one of said negatives, then printing with said other negative and said positive upon a transparent sheet which is sensitized on both sides in such manner that the two images formed on said sheet by the two printings will be out of register with relation to each other, and then developing and coloring both sides of said sheet.

In testimony whereof I have hereunto set my hand.

ARTURO HERNANDEZ-MEJIA.